No. 562,614. Patented June 23, 1896.

Witnesses:
E. C. Duffy
C. M. Werle

Inventor:
David Kaempfer
per O. E. Duffy
Attorney

UNITED STATES PATENT OFFICE.

DAVID KAEMPFER, OF BRUNSWICK, GERMANY, ASSIGNOR TO VOIGTLANDER & SÖHN, OF SAME PLACE.

PHOTOGRAPHIC OBJECTIVE.

SPECIFICATION forming part of Letters Patent No. 562,614, dated June 23, 1896.

Application filed January 2, 1896. Serial No. 574,097. (No model.)

*To all whom it may concern:*

Be it known that I, DAVID KAEMPFER, a subject of the King of Prussia, Emperor of Germany, residing at Brunswick, Germany, have invented certain new and useful Improvements in Photographic Objectives, of which the following is a specification.

This invention relates to photographic objectives, which consist of three lenses cemented together or of two such systems of lenses.

The object of this invention is to obtain a correction of the spherical aberration, i. e., of the sharpness, which is much more perfect than that of the objectives hitherto known consisting of lenses cemented together, and in order to obtain the object in view the invention consists in a photographic objective which is composed of three meniscuses cemented together, viz., of two positive and one negative meniscus, the one positive of which being in the middle between the other positive and the negative meniscus, both the last-named meniscuses having a greater refractive power than the inclosed meniscus. Such a system of lenses can be combined with a second equal but symmetrical system or also with a second unequal system for the purpose of forming a double objective.

A double objective consisting of two equal systems of lenses, the one of which being symmetrical in relation to the other, i. e., being the mirror image of the latter, produces also sharper images than the double objectives hitherto known. By replacing in this double objective the one system of lenses by another, consisting of a double-convex lens, a double-concave lens and a middle positive meniscus, which latter has less refractive power than both the outer lenses, the advantage is obtained that this double objective unites in itself the preferences of each of the two unequal systems of lenses. The system of lenses in which both the outer lenses are respectively double convex and double concave allows a much more perfect correction of the astigmatism, whereas the other system, in which the outer lenses are meniscuses, does not allow this perfect avoidance or suppression of the astigmatism, but allows, as above mentioned, a much more perfect correction of the spherical aberration, i. e., of the sharpness.

Figure 1:
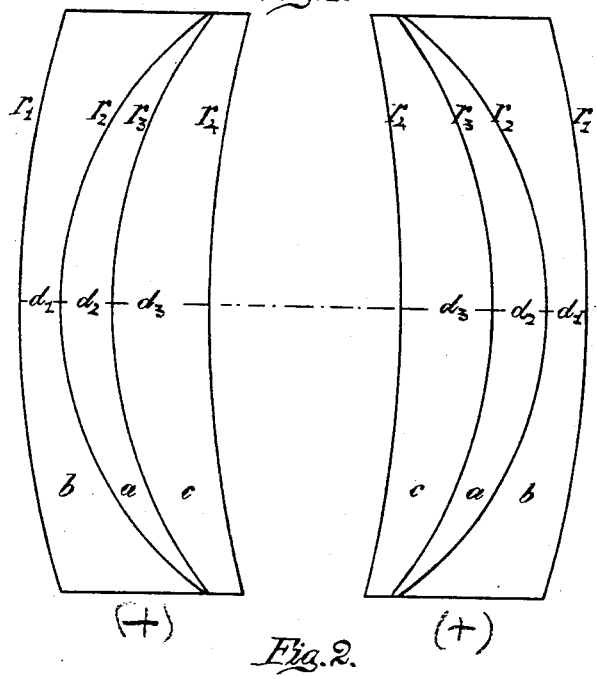
Figure 2:
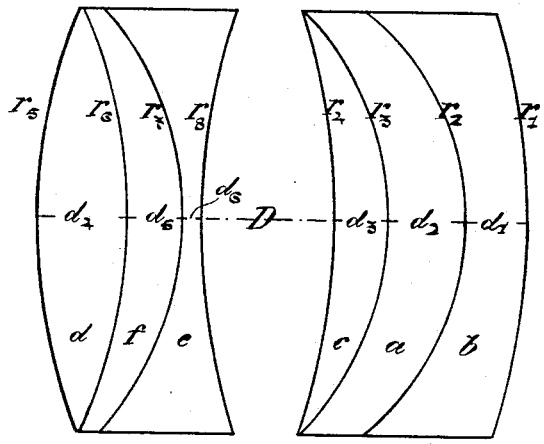

In the accompanying drawings, Figure 1 is a double objective, which is composed according to this invention of two equal symmetrical systems of lenses; and Fig. 2 is a double objective composed of two unequal systems of lenses.

In Fig. 1, left-hand side, $a$ is the middle positive meniscus, $b$ the one outer negative meniscus, and $c$ the other outer positive meniscus. The meniscuses $b$ and $c$ have higher refractive power than the middle meniscus $a$.

In Fig. 1, right-hand side, an equal but symmetrical system of lenses is represented.

The component parts of the objective shown in Fig. 1 by way of example are as follows, if the focal distance is one hundred and fifty millimeters and the aperture is twenty-eight millimeters:

| Radii of curvature. | Thicknesses of glass. | Distance between both the systems. |
|---|---|---|
| Millimeters. | Millimeters. | Millimeters. |
| $r' = 49.4$ | $d' = 2$ | $D = 10$ |
| $r^2 = 16.7$ | $d^2 = 2.7$ | |
| $r^3 = 21.95$ | $d^3 = 4.6$ | |
| $r^4 = 62.2$ | | |

The refractive indices $n$ are, with relation to the Fraunhofer (Wollaston) lines D and F—

For the lens $b$...... $n^D = 1.5682$  $n^F = 1.57637$
For the lens $a$...... $n^D = 1.5262$  $n^F = 1.53347$
For the lens $c$...... $n^D = 1.6112$  $n^F = 1.61873$ In the double objective shown in Fig. 2 the back or hind system of lenses (right-hand side) consists of three meniscuses $a$, $b$, and $c$, whereas the fore system (left-hand side) is composed of a double-convex lens $d$, a double-concave lens $e$, and a middle positive meniscus $f$, which has less refractive power than the outer lenses.

The component parts of the objective shown in Fig. 2 by way of example are as follows, if the focal distance is five hundred and ten millimeters and the ratio of the said distance to the aperture is 1:6.3:

| Fore System. | | Hind System. | |
|---|---|---|---|
| Millimeters. | Millimeters. | Millimeters. | Millimeters. |
| $r^5 = 143$ | $d^4 = 18$ | $r^4 = 156.92$ | $d^3 = 11.4$ |
| $r^6 = 105$ | $d^5 = 10.5$ | $r^3 = 61.806$ | $d^2 = 14.6$ |
| $r^7 = 58.4$ | $d^6 = 4.4$ | $r^2 = 51.366$ | $d' = 13$ |
| $r^8 = 151.8$ | | $r' = 135.49$ | |

D = 24 millimeters.

The refractive indices are—

For the lenses $d$ and $c$ $n^D = 1.6065$ $n^F = 1.61404$
For the lens $f$ ...... $n^D = 1.5367$ $n^F = 1.5441$
For the lens $e$ ...... $n^D = 1.5624$ $n^F = 1.57022$
For the lens $a$ ...... $n^D = 1.5149$ $n^F = 1.52156$
For the lens $b$ ...... $n^D = 1.5687$ $n^F = 1.57686$ Having fully described my invention, what I claim, and desire to secure by Letters Patent, is—

1. In a photographic objective the combination of three meniscuses cemented together, the middle and one outer of which are positive, whereas the other outer meniscus is negative, both the outer ones having greater refractive power, than the middle one, substantially as and for the purpose described.

2. In a photographic objective the combination of two equal, but symmetrical systems of lenses, each consisting of three meniscuses cemented together, the middle and one outer of which are positive, whereas the other outer meniscus is negative, both the outer ones having greater refractive power, than the middle one, substantially as and for the purpose specified.

3. In a photographic objective the combination of a system of lenses, consisting of three meniscuses, cemented together, the middle and one outer of which are positive, whereas the other outer meniscus is negative, both the outer ones having greater refractive power, than the middle one, with another system of lenses, consisting of a double-convex lens, a double-concave lens and a middle positive meniscus cemented together, the latter having less refractive power than both the outer lenses, substantially as and for the purpose specified.

In testimony whereof I have signed my name to this specification in the presence of two subscribing witnesses.

DAVID KAEMPFER.

Witnesses:
JULIUS SECKEL,
MARIE EY.